(12) United States Patent
Kim et al.

(10) Patent No.: US 11,380,484 B2
(45) Date of Patent: Jul. 5, 2022

(54) MULTILAYER ELECTRONIC COMPONENT

(71) Applicant: SAMSUNG ELECTRO-MECHANICS CO., LTD., Suwon-si (KR)

(72) Inventors: Jong Duck Kim, Suwon-si (KR); Jae Sun Won, Suwon-si (KR); Jae Joon Yu, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 68 days.

(21) Appl. No.: 16/869,893

(22) Filed: May 8, 2020

(65) Prior Publication Data

US 2021/0233710 A1 Jul. 29, 2021

(30) Foreign Application Priority Data

Jan. 23, 2020 (KR) .................. 10-2020-0009507

(51) Int. Cl.
| | |
|---|---|
| *H01G 4/232* | (2006.01) |
| *H01G 4/30* | (2006.01) |
| *H01G 4/248* | (2006.01) |
| *H01G 4/012* | (2006.01) |

(52) U.S. Cl.
CPC ............. *H01G 4/232* (2013.01); *H01G 4/012* (2013.01); *H01G 4/248* (2013.01); *H01G 4/30* (2013.01)

(58) Field of Classification Search
CPC ........ H01G 4/38; H01G 4/012; H01G 4/1227; H01G 4/2325; H01G 4/008; H01G 4/242; H01G 4/30; H01G 4/252; H01L 21/4857; H01L 21/486; H01L 23/49822; H01L 23/49827; H01L 23/49838
See application file for complete search history.

(56) References Cited

U.S. PATENT DOCUMENTS

| | | | |
|---|---|---|---|
| 6,327,134 B1 * | 12/2001 | Kuroda ................... | H01G 4/30 361/308.1 |
| 6,370,010 B1 | 4/2002 | Kuroda et al. | |
| 6,606,237 B1 * | 8/2003 | Naito ..................... | H01G 4/232 361/306.3 |

(Continued)

FOREIGN PATENT DOCUMENTS

| | | | |
|---|---|---|---|
| KR | 10-2001-0039561 A | 5/2001 | |
| KR | 10-2015-0018140 A | 2/2015 | |

*Primary Examiner* — Michael P McFadden

(74) *Attorney, Agent, or Firm* — Morgan, Lewis & Bockius LLP

(57) ABSTRACT

A multilayer electronic component includes a body including a first internal electrode and a second internal electrode alternately disposed in a first direction with a dielectric layer interposed therebetween, and including a first surface and a second surface opposing each other in the first direction, a third surface and a fourth surface opposing each other in a second direction, and a fifth surface and a sixth surface opposing each other in a third direction. A first external electrode is disposed on the third, fourth, fifth, and sixth surfaces. A second external electrode is disposed on one or more of the first and second surfaces, and a via electrode is exposed through a surface on which the second external electrode is disposed. A ratio W/L is 0.95 or more and 1.05 or less, where L is a length of the body and W is a width of the body.

14 Claims, 8 Drawing Sheets

(56) References Cited

U.S. PATENT DOCUMENTS

| | | | |
|---|---|---|---|
| 2006/0198079 A1* | 9/2006 | Shim | H01G 4/30 |
| | | | 361/306.3 |
| 2015/0041198 A1 | 2/2015 | Lee et al. | |
| 2015/0302991 A1* | 10/2015 | Choi | H01G 4/232 |
| | | | 361/301.4 |
| 2017/0194419 A1* | 7/2017 | Lee | H05K 1/162 |
| 2018/0035545 A1* | 2/2018 | Lee | H01G 4/30 |
| 2018/0158614 A1* | 6/2018 | Park | H01G 4/232 |
| 2019/0006287 A1* | 1/2019 | Martinez | H01L 28/60 |
| 2019/0385793 A1* | 12/2019 | Wakashima | H01G 4/30 |

\* cited by examiner

MULTILAYER ELECTRONIC COMPONENT

CROSS-REFERENCE TO RELATED APPLICATION(S)

This application claims benefit of priority to Korean Patent Application No. 10-2020-0009507 filed on Jan. 23, 2020 in the Korean Intellectual Property Office, the disclosure of which is incorporated herein by reference in its entirety.

BACKGROUND

1. Field

The present disclosure relates to a multilayer electronic component.

2. Description of Related Art

A multilayer ceramic capacitor (MLCC), a type of multilayer electronic component, may be a chip-type condenser mounted on a printed circuit board of various electronic products such as imaging devices including liquid crystal displays (LCDs), plasma display panels (PDPs), and the like, and computers, smartphones, mobile phones, and the like, serving to charge or discharge electricity therein or therefrom. In addition, the MLCC plays a role such as stabilization in power supply voltage, decoupling, attenuation of high frequency noise, DC-Block, or the like, in an electric control unit (ECU) of a vehicle.

Recently, as functions and performance expectations of electronic products have become advanced, continuous impedance reduction in the high frequency region is desired, and accordingly, demand for low equivalent serial inductance (ESL) MLCC products is rapidly increasing.

Conventional products for lowering ESL may include a low inductance chip capacitor (LICC), a super low inductance capacitor (SLIC), a 3-terminal MLCC, and the like. However, these products have a problem that it is difficult to satisfy the low ESL characteristics in a very high frequency range.

In order to solve this problem, a silicon capacitor having very low ESL has recently been developed, but in the case of the silicon capacitor, there may be a low number of layers that may be stacked in a semiconductor process, thereby making it difficult to secure capacitance.

Accordingly, there is a need to develop a multilayer electronic component having a novel structure, capable of satisfying low ESL characteristics at a high frequency, while securing capacitance.

SUMMARY

An aspect of the present disclosure is to provide a multilayer electronic component having relatively low ESL.

An aspect of the present disclosure is to provide a multilayer electronic component having relatively low ESL even in a high frequency region.

An aspect of the present disclosure is to provide a multilayer electronic component having relatively high capacitance per unit volume.

However, the object of the present disclosure is not limited to the above, and will be more easily understood in the course of describing the specific embodiment of the present disclosure.

According to an aspect of the present disclosure, a multilayer electronic component includes a body including a first internal electrode and a second internal electrode alternately disposed in a first direction with a dielectric layer interposed therebetween, and including a first surface and a second surface opposing each other in the first direction, a third surface and a fourth surface connected to the first and second surfaces and opposing each other in a second direction, and a fifth surface and a sixth surface connected to the first to fourth surfaces and opposing each other in a third direction. A first external electrode is disposed on the third, fourth, fifth, and sixth surfaces and connected to the first internal electrode. A second external electrode is disposed on one or more of the first and second surfaces, and a via electrode is exposed through a surface on which the second external electrode is disposed, and connects the second internal electrode and the second external electrode. A ratio W/L is 0.95 or more and 1.05 or less, where L is a dimension of the body in the second direction, and W is a dimension of the body in the third direction.

According to an aspect of the present disclosure, a multilayer electronic component includes a body including first internal electrodes and second internal electrodes that are alternately stacked in a first direction with dielectric layers disposed therebetween, where each of the first internal electrodes extends to each of four lateral surfaces of the body. A first external electrode is disposed on all four lateral surfaces of the body to connect to the first internal electrodes, and a second external electrode is disposed on one or more end surfaces of the body opposing each other in the first direction and is connected to the second internal electrodes.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
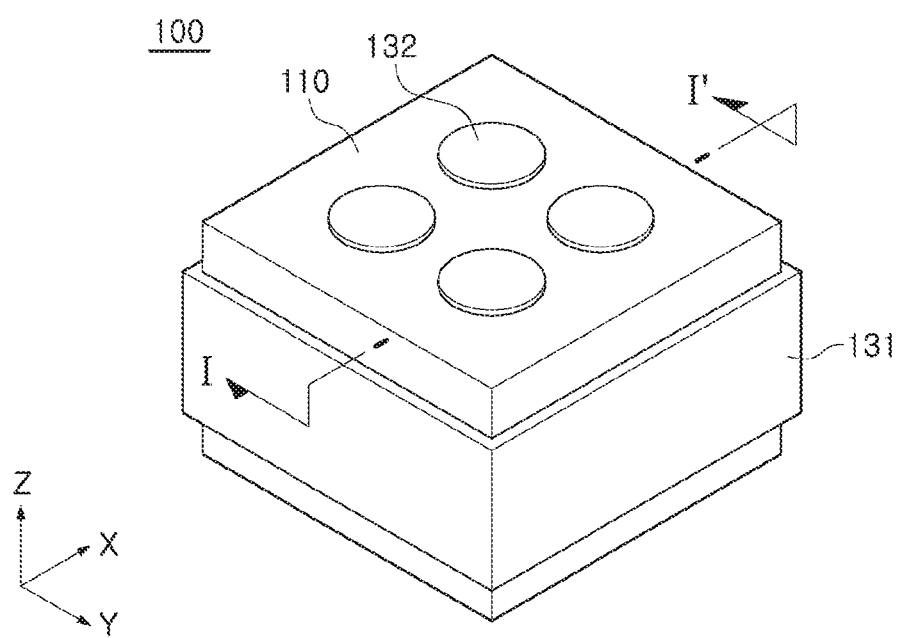
FIG. 1 schematically illustrates a perspective view of a multilayer electronic component according to an embodiment of the present disclosure.

Hereinafter, embodiments of the present disclosure will be described with reference to specific embodiments and the accompanying drawings. However, embodiments of the present disclosure may be modified into various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. The same reference numerals will be used to designate the same components. Further, throughout the specification, when an element is referred to as "comprising" or "including" an element, it means that the element may further include other elements as well, without departing from the scope of the disclosure, unless specifically stated otherwise.

In the drawings, an X direction may be defined as a second direction, an L direction, or a longitudinal direction; a Y direction may be defined as a third direction, a W direction, or a width direction; and a Z direction may be defined as a first direction, a stacking direction, a T direction, or a thickness direction.

Multilayer Electronic Component

FIG. 1 schematically illustrates a perspective view of a multilayer electronic component according to an embodiment of the present disclosure.

Figure 2:
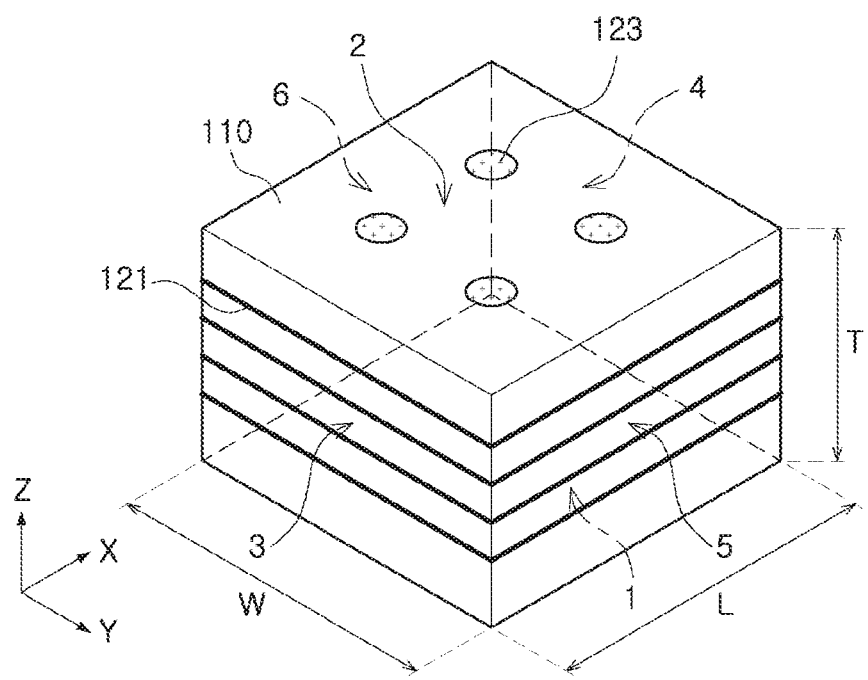
FIG. 2 schematically illustrates a perspective view of the body of FIG. 1 without the external electrodes thereon.

FIG. 2 schematically illustrates a perspective view of the body of FIG. 1, except for the external electrode.

Figure 3:
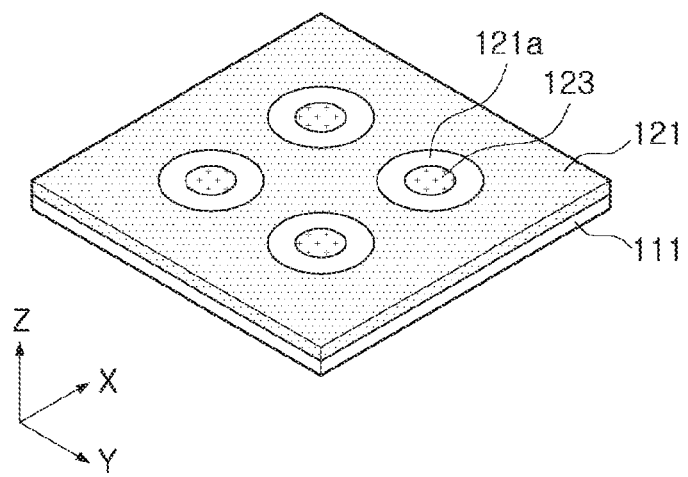
FIG. 3 is a view illustrating a dielectric layer in which a first internal electrode is disposed according to an embodiment of the present disclosure.

FIG. 3 is a view illustrating a dielectric layer in which a first internal electrode is disposed according to an embodiment of the present disclosure.

Figure 4:
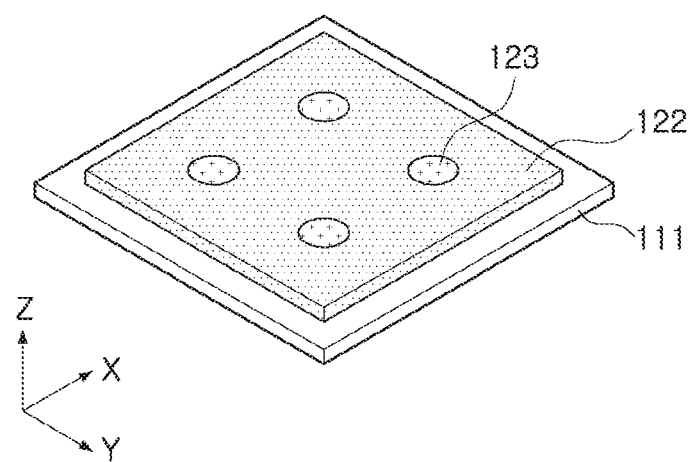
FIG. 4 is a view illustrating a dielectric layer in which a second internal electrode is disposed according to an embodiment of the present disclosure.

FIG. 4 is a view illustrating a dielectric layer in which a second internal electrode is disposed according to an embodiment of the present disclosure.

Figure 5:
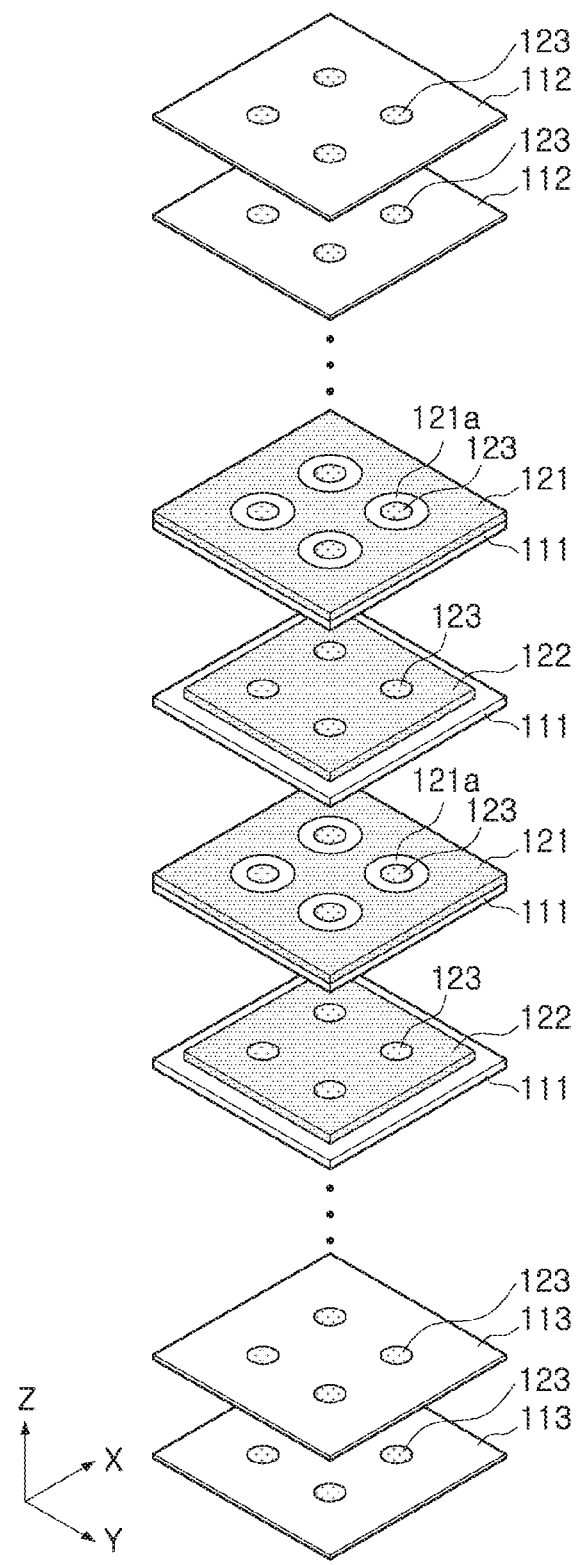
FIG. 5 is an exploded perspective view schematically illustrating an exploded body of FIG. 2.

FIG. 5 is an exploded perspective view schematically illustrating an exploded body of FIG. 2.

Figure 6:
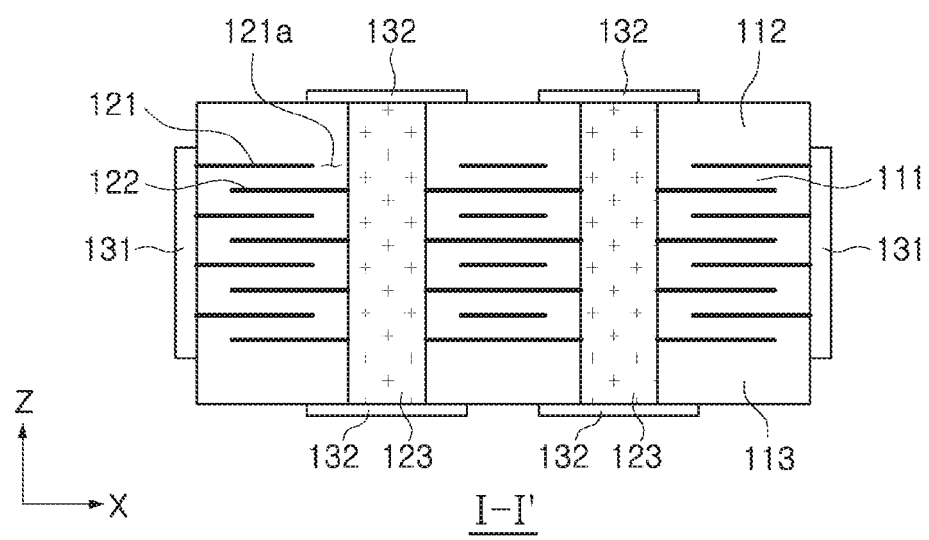
FIG. 6 is a cross-sectional view taken along line I-I' of FIG. 1.

FIG. 6 is a cross-sectional view taken along line I-I' of FIG. 1.

Hereinafter, a multilayer electronic component 100 according to an embodiment of the present disclosure will be described with reference to FIGS. 1 to 6.

The multilayer electronic component 100 according to an embodiment of the present disclosure may include a body 110 including a dielectric layer 111, and a first internal electrode 121 and a second internal electrode 122 alternately disposed in a first direction (a Z direction) with the dielectric layer interposed therebetween, and including a first surface 1 and a second surface 2 opposing each other in the first direction, a third surface 3 and a fourth surface 4 connected to the first and second surfaces and opposing each other in a second direction (an X direction), and a fifth surface 5 and a sixth surface 6 connected to the first to fourth surfaces and opposing each other in a third direction (a Y direction). A first external electrode 131 is disposed on the third to sixth surfaces and connected to the first internal electrode, a second external electrode 132 is disposed on one or more of the first and second surfaces, and a via electrode 123 is exposed from a surface on which the second external electrode 132 is disposed, and connects the second internal electrode and the second external electrode. A ratio W/L is 0.95 or more and 1.05 or less, where L is a dimension of the body in the second direction, and W is a dimension of the body in the third direction.

The L and W dimensions of the body, in the second and third directions, respectively, may be measured using any appropriate method body measurement method. In one illustrative embodiment, the L dimension can be measured in a cross-section of the body 110 extending in the X and Z directions and passing through a center of the body along the Y direction. In the one illustrative embodiment, five L dimension measurements can be taken through the body 110 at evenly spaced locations along the Z direction, and the L dimension may be taken as an average of the five measurements. A similar approach may be used for measurement of the W dimension. Alternatively, other appropriate measurement methods may be used.

Conventional products for lowering ESL may include a low inductance chip capacitor (LICC), a super low inductance capacitor (SLIC), a 3-terminal MLCC, and the like. However, these products have a problem that it is difficult to satisfy the low ESL characteristics in a very high frequency range.

In order to solve this problem, a silicon capacitor having very low ESL has been recently developed, but in the case of the silicon capacitor, there may be a low number of layers that may be stacked in a semiconductor process, thereby making it difficult to secure capacitance.

Therefore, in the present disclosure, a length (L) of the body and a width (W) of the body may be controlled almost similarly (e.g., to be almost equal to each other), and the first internal electrode 121 may be exposed from the third to sixth surfaces of the body to be connected (e.g., directly connected) to the first external electrode 131. The second internal electrode 122 and the second external electrode 132 may be connected by the via electrode 123 to minimize a current loop and widen an area connected to a substrate, during mounting, to lower ESL. In particular, according to the present disclosure, ESL in a high frequency region may be significantly reduced.

In the body 110, the dielectric layer 111 and the internal electrodes 121 and 122 may be alternately stacked.

The body 110 may have the first and second surfaces 1 and 2 opposing each other in the first direction (the Z direction), the third and fourth surfaces 3 and 4 connected to the first and second surfaces 1 and 2 and opposing each other in the second direction (the X direction), and fifth and sixth surfaces 5 and 6 connected to the first and second surfaces 1 and 2, connected to the third and fourth surfaces 3 and 4, and opposing each other in the third direction (the Y direction). Further, the body 110 may have a hexahedral shape or the like. Due to shrinkage of ceramic powder contained in the body 110 during a sintering process, the body 110 may not have a perfectly hexahedral shape with completely straight lines, but may have a substantially hexahedral shape.

A ratio W/L may be 0.95 or more and 1.05 or less, where L is a dimension of the body in the second direction, and W is a dimension of the body in the third direction. When the W/L is less than 0.95 or greater than 1.05, a distance between the external electrodes of the two surfaces, among the four surfaces, becomes longer. In this case, since a length of a current loop may increase, ESL may increase. Therefore, W/L may be 0.95 or more and 1.05 or less, and more preferably, L and W may be substantially the same. For example, more preferably, an L-W cross section of the body may have a substantially square shape.

In this case, a dimension (L) (e.g., a length) of the body in the second direction and a dimension (W) (e.g., a width) of the body in the third direction may be 0.5 mm or less, respectively. When the dimension (L) of the body in the second direction or the dimension (W) of the body in the third direction exceeds 0.5 mm, a distance between the electrodes may increase. In this case, since a length of a current loop may increase, ESL may increase. In addition, since a dimension of the first external electrode 131 in the second direction or a dimension of the first external electrode 131 in the third direction may be also increased, ESL in a low-frequency region may be lowered by multiple resonances with parasitic components inside a multilayer electronic component.

A plurality of dielectric layers 111 forming the body 110 may be in a sintered state, and a boundary between adjacent dielectric layers 111 may be integrated to such an extent that it is difficult to identify the layers without using a scanning electron microscope (SEM).

According to an embodiment of the present disclosure, a raw material for forming the dielectric layer 111 is not particularly limited, as long as sufficient capacitance may be obtained therewith. For example, a barium titanate-based material, a lead composite perovskite-based material, a strontium titanate-based material, or the like may be used. The barium titanate-based material may include a $BaTiO_3$-based ceramic powder, and examples of the ceramic powder may include $BaTiO_3$, or $(Ba_{1-x}Ca_x) TiO_3$, $Ba (Ti_{1-y}Ca_y)O_3$, $(Ba_{1-x}Ca_x) (Ti_{1-y}Zr_y)O_3$, or $Ba (Ti_{1-y}Zr_y)O_3$, in which calcium (Ca), zirconium (Zr), or the like is partially dissolved into $BaTiO_3$, or the like.

As the material for forming the dielectric layer 111, various ceramic additives, organic solvents, plasticizers, binders, dispersants, or the like may be added to powder particles such as barium titanate ($BaTiO_3$) according to the purpose of the present disclosure. In this case, as the ceramic additives, various kinds such as transition metal oxides or carbides, rare earth elements, magnesium (Mg), aluminum (Al), or the like may be used.

The body 110 may include a capacitance forming portion disposed in the body 110 and including the first internal electrode 121 and the second internal electrode 122 disposed to oppose each other with the dielectric layer 111 interposed therebetween, to form capacitance; and an upper protective layer 112 and a lower protective layer 113 formed on the capacitance forming portion in upward and downward directions, respectively.

The capacitance forming portion may be a portion that contributes to formation of capacitance of the capacitor, and may be formed by repeatedly and alternately stacking the plurality of first and second internal electrodes 121 and 122 with the dielectric layers 111 interposed therebetween.

The upper protective layer 112 and the lower protective layer 113 may be formed by stacking a single dielectric layer or two or more dielectric layers on upper and lower surfaces of the capacitance forming portion, respectively, in a vertical direction, and may basically play a role in preventing damage to the internal electrodes due to physical or chemical stress. In addition, the via electrode 123 may be included in the upper protective layer 112 and/or the lower protective layer 113, the first internal electrode 121 and the second external electrode 132 may be insulated from each other, and the second internal electrode 122 and the second external electrode 132 may be electrically connected to each other by the via electrode 123.

The upper protective layer 112 and the lower protective layer 113 may not include any internal electrode(s) therein, and may include the same material as the dielectric layer 111.

The internal electrodes 121 and 122 may be arranged to oppose (or face) each other with the dielectric layer 111 interposed therebetween. The internal electrodes 121 and 122 may include first internal electrodes 121 that are alternately stacked with second internal electrodes 122 to face and overlap each other, and the dielectric layers may be interposed between the first and second internal electrodes 121 and 122.

The first internal electrode 121 may be exposed through the third to sixth surfaces of the body 110, and the second internal electrode 122 may be disposed to have edges thereof spaced apart from the third to sixth surfaces of the body 110. Therefore, the first internal electrode 121 may be exposed from the third to sixth surfaces to be directly connected to the first external electrode 131 disposed on the third to sixth surfaces, and the second internal electrode 122 may be connected to the second external electrode 132 by the via electrode 123. The first internal electrode 121 and the second internal electrode 122 may have different polarities.

In this case, a length and a width of the first internal electrode 121 may be substantially the same as the length (L) and the width (W) of the body 110. For example, ends of the first internal electrode 121 may be all exposed from the body 110 externally, and the second internal electrode 122 may be formed not to be exposed from the body 110 externally. Therefore, electrical connectivity of the first internal electrode 121 with the first external electrode 131 may be improved, and an area of overlap of the first internal electrode 121 with the second internal electrode 122 may be maximized, to improve capacitance per unit volume.

The first and second internal electrodes 121 and 122 may be electrically separated and isolated from each other by the dielectric layer 111 interposed therebetween.

The body 110 may be formed by alternately stacking a dielectric layer 111 on which the first internal electrode 121 is printed and a dielectric layer 111 on which the second internal electrode 122 is printed in the thickness direction (the Z direction), and then sintering the same.

In this case, the first internal electrode 121 and the second internal electrode 122 may be stacked, such that the number thereof is 20 or less, respectively. For example, the first and second internal electrodes 121 and 122 may be stacked such that the total number of stacked bodies is 40 or less. When the total number of stacked bodies of the first and second internal electrodes 121 and 122 is more than 40, mounting reliability may deteriorate as a thickness (T) of the body 110 is increased, and impedance at a specific frequency may increase due to occurrence of a resonance phenomenon.

In addition, the first internal electrodes 121 and the second internal electrodes 122 may be stacked, such that the number thereof is 10 or less, respectively. For example, the first and second internal electrodes 121 and 122 may be stacked such that the total number of stacked bodies is 20 or less.

When the total number of stacked bodies of the first and second internal electrodes 121 and 122 is more than 20, a dimension of the first external electrode 131 in the first direction may be increased. In this case, impedance at a specific frequency may increase by multiple resonances with parasitic components inside a multilayer electronic component.

A material for forming the internal electrodes 121 and 122 is not particularly limited, and a material having excellent electrical conductivity may be used. For example, the internal electrodes 121 and 122 may be formed by printing a conductive paste for the internal electrodes containing one or more of nickel (Ni), copper (Cu), palladium (Pd), silver (Ag), gold (Au), platinum (Pt), tin (Sn), tungsten (W), titanium (Ti), and alloys thereof, on a ceramic green sheet.

As a printing method of the conductive paste for the internal electrodes, a screen-printing method, a gravure printing method, or the like may be used, but the present disclosure is not limited thereto.

The via electrode 123 may be exposed through a surface on which the second external electrode 132 is disposed, to connect the second internal electrode(s) 122 and the second external electrode 132.

The via electrode 123 may be not electrically connected to the first internal electrode(s) 121. To this end, the first internal electrode(s) 121 may include an insulating portion 121a so as to be spaced apart from the via electrode 123, and the via electrode 123 may be disposed to penetrate the insulating portion 121a and the second internal electrode 122. In this case, a direction in which the via electrode 123 passes through the body 110 may be the first direction.

The via electrode 123 may be formed by forming a via in the body 110 and then filling the via with a conductive material. In this case, the conductive material may be one or more of nickel (Ni), copper (Cu), palladium (Pd), silver (Ag), gold (Au), platinum (Pt), tin (Sn), tungsten (W), titanium (Ti), and alloys thereof.

To form the via, a physical penetrating process using a mechanical pin puncher or the like, or a laser drill may be used. When a thickness of the body is too thick and the laser drill is used, a peripheral portion of the via may be damaged to deteriorate connectivity of the second internal electrode 122. Therefore, the physical penetrating process may be preferably used.

In an embodiment of the present disclosure, four via electrodes 123 are illustrated, but the present disclosure is not limited thereto. For example, the via electrode 123 may be provided as a single via electrode, and may be provided as a plurality of via electrodes, such as two or more via electrodes.

As the plurality of via electrodes 123 are disposed, a current loop length may be further minimized to reduce ESL. Therefore, the via electrodes 123 may be provided as two or more via electrodes in order to further reduce the ESL.

The external electrodes 131 and 132 may be arranged on the body 110, and may be electrically connected to the internal electrodes 121 and 122, respectively.

The first external electrode 131 may be disposed on the third to sixth surfaces of the body 110, and may be connected to the first internal electrode 121. The second external electrode may be disposed on at least one of the first and second surfaces of the body 110 to be connected to the via electrode 123, and may be electrically connected to the second internal electrode 122 by the via electrode 123.

As illustrated in FIG. 1, the first external electrode 131 may be disposed to surround the third to sixth surfaces of the body 110. Therefore, an area contacting the first internal electrode 121 may be maximized, and electrical connectivity with the first internal electrode 121 may be improved.

Figure 7:
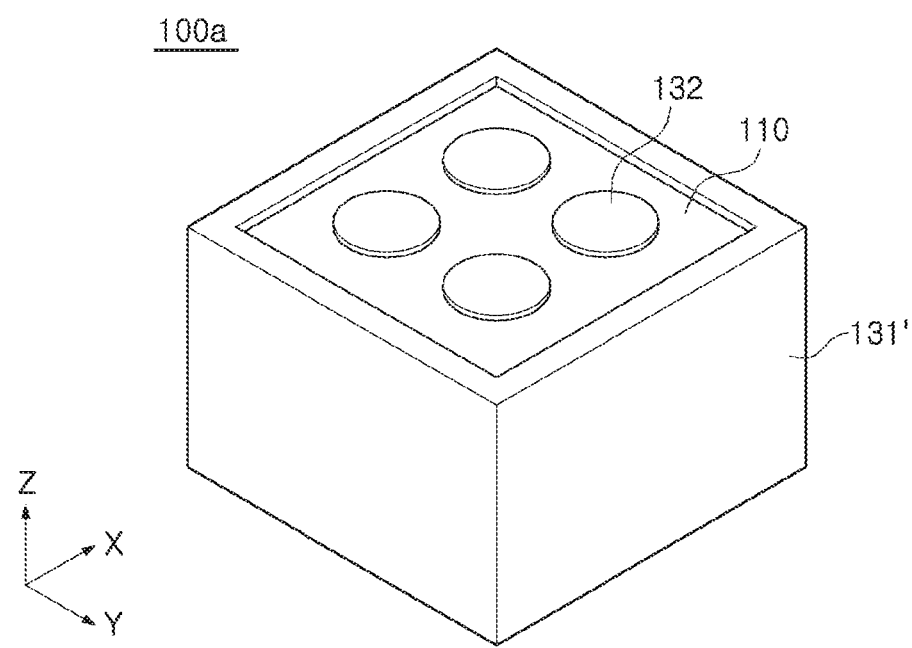
FIG. 7 schematically illustrates a perspective view of a multilayer electronic component according to a first modification of the present disclosure.

In addition, referring to FIG. 7 schematically illustrating a perspective view of a multilayer electronic component 100a according to a first modification of the present disclosure, a first external electrode 131' may be disposed to extend to a portion of the first and second surfaces of the body 110. Therefore, by increasing an area connected to the substrate during mounting, ESL may be further lowered and mounting reliability may be improved.

When two or more via electrodes 123 are provided, the second external electrode 132 may be provided as a plurality of second external electrodes to be connected to each of the two or more via electrodes 123 on the first surface or the second surface of the body 110, as illustrated in FIG. 1.

Figure 8:
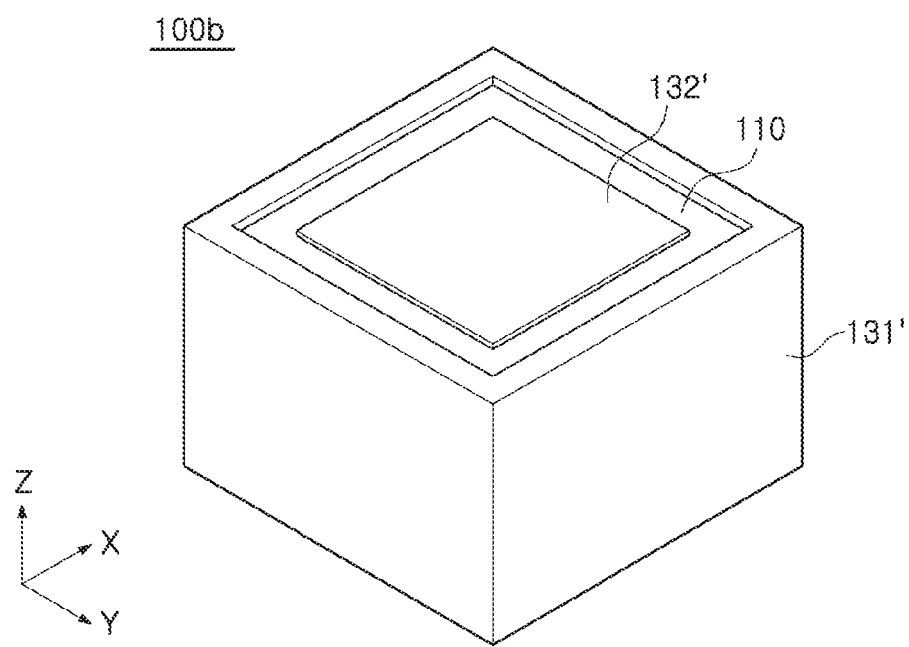
FIG. 8 schematically illustrates a perspective view of a multilayer electronic component according to a second modification of the present disclosure.

In addition, referring to FIG. 8 schematically illustrating a perspective view of a multilayer electronic component 100b according to a second modification of the present disclosure, when two or more via electrodes 123 are provided, the second external electrode 132' may be disposed to be connected to all of the two or more via electrodes 123. Therefore, by increasing an area connected to the substrate during mounting, ESL may be further lowered and mounting reliability may be improved.

The external electrodes 131 and 132 may be formed of any material as long as they have electrical conductivity, such as metal. Specific materials may be determined in consideration of electrical characteristics, structural stability, etc., and may further have a multilayer structure.

For example, the external electrodes 131 and 132 may be plastic electrodes including conductive metal and glass, or resin-based electrodes including a conductive metal and a resin.

In addition, the external electrodes 131 and 132 may have a form in which the plastic electrodes and the resin-based electrodes are sequentially formed on the body. In addition, the external electrodes 131 and 132 may be formed by transferring a sheet including the conductive metal on the body, or may be formed by transferring the sheet including the conductive metal on the sintered electrode. In addition, the external electrodes 131 and 132 may be formed using an atomic layer deposition (ALD) process, a molecular layer deposition (MLD) process, a chemical vapor deposition (CVD) process, a sputtering process, or the like.

The conductive metal used for the external electrodes 131 and 132 is not particularly limited as long as it is a material that may be electrically connected to the internal electrode to form capacitance. For example, one or more selected from the group consisting of nickel (Ni), copper (Cu), palladium (Pd), silver (Ag), gold (Au), platinum (Pt), tin (Sn), tungsten (W), titanium (Ti), and alloys thereof may be included.

Further, a plating layer may be disposed on the outer surface of the external electrode. As a more specific example of the plating layer, the plating layer may be nickel (Ni) plating layers, or tin (Sn) plating layers, may have a form in which the nickel (Ni) plating layers and the tin (Sn) plating layers are sequentially formed, and may have a form in which the tin (Sn) plating layer, the nickel (Ni) plating layer, and the tin (Sn) plating layer are formed sequentially. In addition, the plating layers may include a plurality of nickel (Ni) plating layers and/or a plurality of tin (Sn) plating layers.

EXAMPLE

Figure 9:
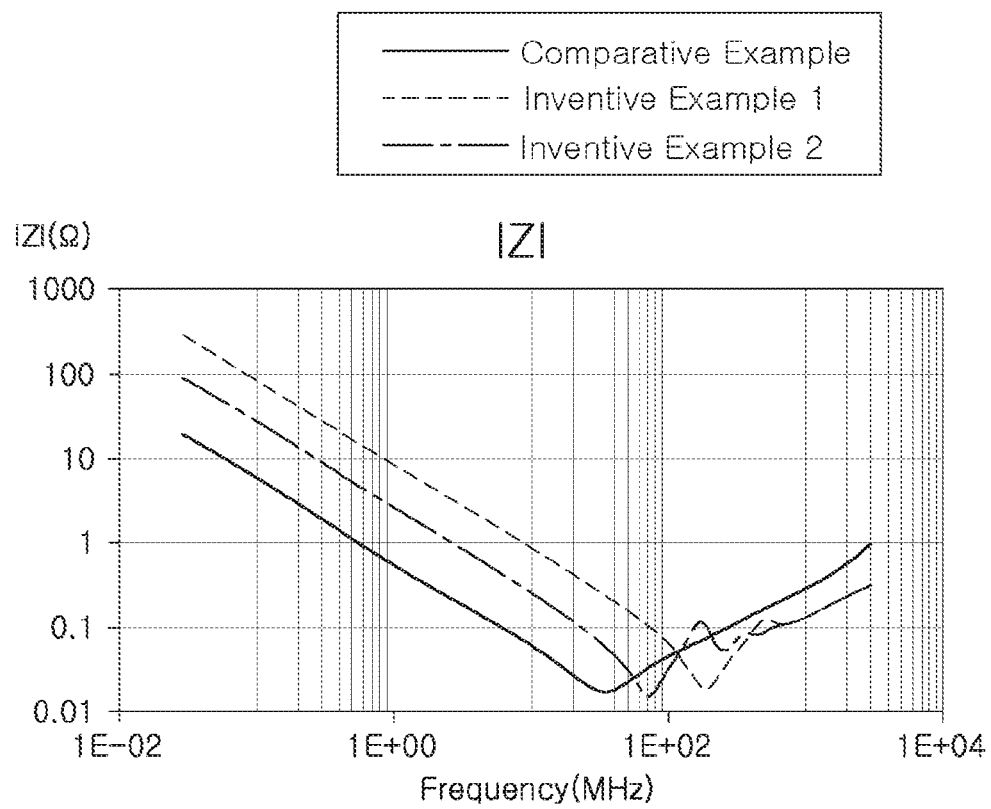
FIG. 9 is a graph showing measurements of a change in impedance according to frequencies of Comparative Example, Inventive Example 1, and Inventive Example 2.

FIG. 9 is a graph measuring a change in impedance according to frequencies of a Comparative Example, an Inventive Example 1, and an Inventive Example 2, and Table 1 below is simulation examples of impedance values according to frequencies of the Comparative Example, the Inventive Example 1, and the Inventive Example 2. Impedance values at high frequency may be directly proportional to ESL values.

Comparative Example was a MLCC having a conventional three-terminal structure. In this case, L of the body was 1000 µm, W of the body was 500 µm, and 10 first internal electrodes and 10 second internal electrodes are stacked, and the total number of stacked internal electrodes was 20.

Inventive Examples 1 and 2 were multilayer electronic components manufactured according to an embodiment of the present disclosure. In Inventive Example 1, L and W of the body were set to be 300 µm, and 10 first internal electrodes and 10 second internal electrodes were stacked, and the total number of stacked internal electrodes was 20. In Inventive Example 2, L and W of the body were set to be 300 µm, and 30 first internal electrodes and 30 second internal electrodes were stacked, and the total number of stacked internal electrodes was 60.

TABLE 1

| Example | 200 MHz | 300 MHz | 500 MHz | 700 MHz | 1 GHz | 2 GHz | 3 GHz |
| --- | --- | --- | --- | --- | --- | --- | --- |
| Comparative | 62.45 pH | 58.77 pH | 53.30 pH | 49.67 pH | 46.73 pH | 46.86 pH | 51.31 pH |
| Inventive 1 | 15.68 pH | 25.42 pH | 36.92 pH | 23.73 pH | 21.11 pH | 17.56 pH | 16.15 pH |
| Inventive 2 | 72.09 pH | 35.20 pH | 27.99 pH | 24.47 pH | 21.71 pH | 17.97 pH | 16.57 pH |

Referring to FIG. 9, sizes of Inventive Examples 1 and 2 may be small, compared to Comparative Example. Therefore, the total capacitance compared to the three-terminal is somewhat relatively low, but the capacitance per unit volume is relatively high.

In addition, when comparing Inventive Example 1 and Inventive Example 2, it can be seen that self-resonance frequency (SRF) increases as the total number of stacked bodies of internal electrodes decreases.

Referring to Table 1, in the case of Inventive Example 2, ESL characteristics were measured to be relatively high due to resonance effect in the 200 MHz band, but it can be seen that the Inventive Examples 1 and 2 had lower ESL characteristics than Comparative Example.

In particular, it can be seen that at frequencies of 300 MHz or higher, as the frequency increases, ESL characteristics of Inventive Examples 1 and 2 were significantly lower than that of Comparative Example.

In the case of Inventive Example 2, the measurement of the ESL characteristic to be relatively high in the 200 MHz band may be a phenomenon caused by increasing a distance of the first electrode in the first direction as the total number of stacked bodies of the internal electrode increases, thereby causing multiple resonances with parasitic components inside the multilayer electronic component.

One of the various effects of the present disclosure may be to lower the ESL by controlling a shape of a body, and arrangement of external and internal electrodes. In particular, according to the present disclosure, ESL in a high frequency region may be reduced.

One of several effects of the present disclosure may provide a multilayer electronic component having a high capacitance per unit volume.

However, various advantages and effects of the present disclosure are not limited to the above, and can be more easily understood in the process of describing the specific embodiment of the present disclosure.

While example embodiments have been illustrated and described above, it will be apparent to those skilled in the art that modifications and variations could be made without departing from the scope of the present disclosure as defined by the appended claims.

What is claimed is:

1. A multilayer electronic component comprising: a body including a first internal electrode and a second internal electrode alternately disposed in a first direction of the body with a dielectric layer interposed therebetween, and including a first surface and a second surface opposing each other in the first direction, a third surface and a fourth surface connected to the first and second surfaces and opposing each other in a second direction of the body, and a fifth surface and a sixth surface connected to the first to fourth surfaces and opposing each other in a third direction of the body; a first external electrode surrounding the third, fourth, fifth, and sixth surfaces and connected to the first internal electrode; a second external electrode disposed on one or more of the first and second surfaces; and a via electrode being in contact with a surface on which the second external electrode is disposed, and connecting the second internal electrode and the second external electrode, wherein a ratio W/L is 0.95 or more and 1.05 or less, where L is a dimension of the body in the second direction and W is a dimension of the body in the third direction, and the first external electrode is spaced apart from edges of the first or second surface.

2. The multilayer electronic component according to claim 1, wherein L and W are each 0.5 mm or less.

3. The multilayer electronic component according to claim 1, wherein the first internal electrode is in contact with each of the third to sixth surfaces, and
the second internal electrode is disposed to be spaced apart from each of the third to sixth surfaces.

4. The multilayer electronic component according to claim 3, wherein a length and a width of the first internal electrode are substantially the same as a length and a width of the body, respectively.

5. The multilayer electronic component according to claim 1, wherein the body includes a plurality of first internal electrodes and a plurality of second internal electrodes, and a number of each of the first and second internal electrodes in the body is 20 or less.

6. The multilayer electronic component according to claim 1, wherein the first internal electrode comprises an insulating portion that provides a space between the first internal electrode and the via electrode, and
the via electrode is disposed to penetrate the second internal electrode and the insulating portion.

7. The multilayer electronic component according to claim 1, wherein the multilayer electronic component includes a plurality of via electrodes.

8. The multilayer electronic component according to claim 7, wherein the multilayer electronic component includes a plurality of second external electrodes each connected to the second external electrode by the plurality of via electrodes.

9. The multilayer electronic component according to claim 7, wherein the second external electrode contacts each of the plurality of via electrodes on the first surface or the second surface.

10. The multilayer electronic component of claim 1, wherein each of the first internal electrodes extends along a full width of each of the third, fourth, fifth, and sixth surfaces of the body.

11. The multilayer electronic component of claim 10, wherein the first external electrode extends across the full width of each of the third, fourth, fifth, and sixth surfaces of the body.

12. The multilayer electronic component of claim 1, further comprising one or more via electrodes extending through the body in the first direction to connect the second external electrode and the second internal electrodes.

13. The multilayer electronic component of claim 1, wherein a ratio W1/L1 is 0.95 or more and 1.05 or less, where L1 and W1 are dimensions of the first internal electrodes in respective second and third directions orthogonal to each other and the first direction.

14. The multilayer electronic component of claim 1, wherein the first external electrode is spaced apart from each edge of the first and second surfaces.

* * * * *